UNITED STATES PATENT OFFICE.

JOHN H. GLAZIER, OF KANSAS CITY, MISSOURI.

PROCESS OF MAKING STOCK FOOD FROM CACTUS.

987,062.  Specification of Letters Patent.  Patented Mar. 14, 1911.

No Drawing.  Application filed February 4, 1910. Serial No. 541,965.

*To all whom it may concern:*

Be it known that I, JOHN H. GLAZIER, a citizen of the United States, residing at Kansas City, in the county of Jackson and State of Missouri, have invented certain new and useful Improvements in Processes of Making Stock Food from Cactus; and I do declare the following to be a full, clear, and exact description of the invention, such as will enable others skilled in the art to which it appertains to make and use the same.

My invention relates to a process for making stock food from cactus, and has for its object to provide a stock food from the cactus plant, which heretofore has had no commercial value.

The leaves of the cactus plant, especially that species commonly known as the "prickly pear", when reduced to particles, may be used as a base for a stock food. In preparing the cactus for my process, I sever the leaves from the trunk and run them through a cutting machine, which cuts the leaves into pieces ranging from one-fourth inch to one and one-fourth inches square. I then mix with the cactus a suitable quantity of one or more fattening elements, such for example as ground corn, dipped alfalfa, linseed meal, cottonseed meal, linseed, cottonseed, or chopped corn stalks. Any one of these substances alone may be used, or mixtures of any two or more of them; the proportion of the mixture being usually about four hundred pounds of fattening ingredient to two thousand pounds of cactus, although it is readily apparent that to enrich the food the quantity of fattening element may be increased. After the ingredients have been cut and chopped, as mentioned, they are placed in a cooker, of any suitable type, such as an ordinary boiler, having a cover, or a steam cooker having a helical or spiral steam pipe, passing therethrough and exposed to the contained mass.

In chopping the cactus and removing same from the chopper to the cooker it is essential that the juice be saved, as it will contain food elements desirable to be retained in the food product. As the material, when placed in the cooker, will contain a considerably greater quantity of cactus juice than is needed for the product, and which would in fact interfere with the cooking process, I provide a separate juice receptacle into which the free juice may pass from the cooker, so that only a sufficient amount of liquid is retained in the cooker to moisten the matter during the cooking process. The drain pipe is preferably located in the bottom of the cooker and may be provided with a cock, so that the escape of steam may be controlled.

A suitable device for carrying out the above process may comprise an ordinary boiler having a drain pipe opening therefrom, and a bucket or receptacle for receiving the juice from the drain pipe.

The material will become cooked in from 36 to 60 hours, according to the temperature in the cooker and the properties of the material, after which it should be permitted to cool before being exposed to the air. After the mass has cooked and as soon as it is cool, a part of the juice from the receptacle is poured over it, so that the nutriment in the juice will be re-incorporated in the product. As some species of cactus are made up of from sixty to seventy per cent. water, it is apparent that to return all of this liquid to the cooked mass would make the mass so moist that it could not be conveniently handled or shipped. For this reason, but a part of the liquid is returned to the food, and the balance drawn off to be reduced to other uses. This food may be fed to the stock in this wet state; or, it may be conveyed to a drying room, and dried by any desired process or method, a suitable drying agent, such as steam or hot air being employed, if desired. In some cases, such as when it is desired to ship the food considerable distances, it may be advisable to pulverize the product after drying, so that it may be sealed in packages, or sewed in sacks, the pulverizing also serving to reduce any cactus spines that may not have been dissolved in the cooking process.

Having thus described my invention, what I claim as new therein and desire to secure by Letters Patent is:—

1. The process of making a stock food, consisting in reducing cactus to particles, draining off juice from the solid matter, cooking the solid matter, cooling the mass, and restoring to the mass the uncooked juice previously drained therefrom, substantially as described.

2. The process of making a stock food, consisting in reducing cactus to particles, draining off juice from the solid matter, cooking the solid matter, cooling the solid matter, restoring to the solid matter the juice previously drained therefrom, and drying the mass, substantially as described.

3. The process of making a stock food, consisting of reducing cactus to particles, draining off juice therefrom, adding a fattening ingredient, cooking the mixture, cooling and adding the drained off cactus juice and drying same; substantially as described.

In testimony whereof I affix my signature in presence of two witnesses.

JOHN H. GLAZIER.

Witnesses:
MYRTLE M. JACKSON,
K. W. IMBODEN.

Copies of this patent may be obtained for five cents each, by addressing the "Commissioner of Patents, Washington, D. C."